United States Patent
Serbest et al.

(10) Patent No.: US 7,570,637 B2
(45) Date of Patent: Aug. 4, 2009

(54) DELIVERY OF BROADCAST TV OVER POINT-POINT ROUTED GRE TUNNELS FOR IPTV APPLICATIONS

(75) Inventors: Yetik Serbest, Austin, TX (US); Stephanie Karasick, Austin, TX (US); Eric Puetz, Georgetown, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 545 days.

(21) Appl. No.: 11/245,654

(22) Filed: Oct. 7, 2005

(65) Prior Publication Data

US 2007/0083907 A1 Apr. 12, 2007

(51) Int. Cl.
*H04L 12/28* (2006.01)
(52) U.S. Cl. .................. 370/389; 370/401
(58) Field of Classification Search ............ 370/389, 370/392, 396, 400–405
See application file for complete search history.

(56) References Cited

U.S. PATENT DOCUMENTS

| | | | |
|---|---|---|---|
| 4,897,841 A | 1/1990 | Gang, Jr. | |
| 4,901,312 A | 2/1990 | Hui et al. | |
| 5,220,420 A | 6/1993 | Hoarty et al. | |
| 5,247,347 A | 9/1993 | Litteral et al. | |
| 5,430,727 A | 7/1995 | Callon | |
| 5,544,161 A | 8/1996 | Bigham et al. | |
| 6,041,056 A | 3/2000 | Bigham et al. | |
| 6,567,986 B2* | 5/2003 | Ward et al. | 725/118 |
| 6,779,051 B1 | 8/2004 | Basil et al. | |
| 6,963,575 B1* | 11/2005 | Sistanizadeh et al. | 370/404 |
| 7,230,912 B1* | 6/2007 | Ghosh et al. | 370/216 |
| 2005/0026638 A1* | 2/2005 | Romana et al. | 455/502 |
| 2005/0117608 A1* | 6/2005 | Karakawa et al. | 370/486 |
| 2006/0088031 A1* | 4/2006 | Nalawade | 370/390 |

OTHER PUBLICATIONS

Pepelnjak et al., MPLS and VPN Architectures, vol. II, Jun. 6, 2003, http://www.ciscopress.com, 8 pages.

\* cited by examiner

*Primary Examiner*—Hong Cho
(74) *Attorney, Agent, or Firm*—Jackson Walker L.L.P.

(57) ABSTRACT

The present invention provides a method for distributing Internet Protocol Television (IPTV) content over a national IP backbone using GRE tunneling in a point-to-point ring topology. A logical path is defined that connects multiple hub offices, each including at least two routers, in a ring network topology. Generic Routing Encapsulation (GRE) tunnels are used over an existing Internet Protocol (IP) backbone to establish connectivity between adjacent hub offices. A direction for content flow is defined. The direction of flow may be determined by selecting a designated router. The routers of the hub offices selectively join to upstream routers. This direction may be reversed by changing the direction of in which routers join. IPTV content is distributed over the defined path using the GRE tunnels. The necessity of forwarding the content is determined at each hub office.

20 Claims, 5 Drawing Sheets

DELIVERY OF BROADCAST TV OVER POINT-POINT ROUTED GRE TUNNELS FOR IPTV APPLICATIONS

BACKGROUND OF THE INVENTION

1. Field of the Invention

The present invention relates to the field of content distribution in an IPTV (Internet Protocol Television) network. In particular, the present invention provides an system and method for delivering IPTV content over an existing Internet Protocol (IP) backbone using Generic Routing Encapsulation (GRE) tunneling.

2. Description of the Related Art

Internet Protocol Television (IPTV) is a system for transmitting television content over high-speed Internet connections. Conventional television content is usually sent to television sets by way of either cable, satellite, or through the air in the form of analog or digital signals. IPTV is similar to VoIP (Voice over Internet Protocol) for telephonic signals, in that it includes breaking a signal into packets at a source, sending the data (e.g. video programming) across the Internet using a suitable protocol, and reassembling the packets at a destination.

In IPTV applications, national content and programming are generally accumulated at one or two places, commonly referred to as Super Hub Offices (SHOs). This content is distributed from the SHOs to multiple Video Hub Offices (VHOs). Local channels and programming content are added at the VHO. IPTV programs are commonly stored as video at the VHOs and sent out to local customers who receive the signal at computers or at special set-top boxes attached to television sets, for instance.

There are generally several methods available for use in data distribution. Unicasting describes communication in which a piece of information is sent from one (source) point to another (destination) point, where a point may refer to a router, for example. If there are multiple destination points, then the information is transmitted from the source point multiple times, once for each destination point. Protocols that operate through unicasting include http, smtp, ftp and telnet. Multicasting describes communication in which a packet of information is sent from one source point to many destination points without having to duplicate the packet at the source point for each recipient. Multicasting is not the same as broadcasting on the Internet or on a LAN. Broadcast data are sent to every possible receiver, while multicast packets are sent only to receivers that want them.

Packets distributed using multicasting are replicated in the network by routers enabled with a multicast routing protocol, such as Protocol Independent Multicasting (PIM). PIM is an adaptive method of multicasting that responds to changes in network conditions and to changes in distributions of destination points. PIM finds a multicast path between source and destinations. PIM provides method of joining routers and an ability to recover from router failure. The multicast router determines which direction is upstream (towards the source) and which is downstream. A PIM adjacency is a relationship between selected neighboring routers and end nodes for the purpose of exchanging routing information Routers executing a multicast routing protocol, such as PIM, maintain forwarding tables. These routers may separate routing and forwarding functionality. Non-Stop Forwarding (NSF) is a generic term for the ability of a router to carry on forwarding packets even though the device responsible for the calculation of the routing and forwarding tables may be temporarily inoperable. NSF fundamentally relies on the separation of routing and forwarding functionality within the router.

Several network architectures are currently available in the prior art for distributing TV content from the SHOs to the VHOs. FIG. 1 (Prior Art) shows a Synchronous Optical Network (SONET) ring architecture. In a SONET ring, digital signals travel over a fiber optic cable. The two SONET rings 110 and 120 shown in FIG. 1 provide connections from SHOs 102 and 103 to VHOs 104, 106, and 108. Each SHO and each VHO connects to the ring at a Point-of-Presence (POP) 122 via an add/drop multiplexer (ADM) 140 capable of extracting and inserting lower-rate signals from a higher-rate multiplexed signal without completely de-multiplexing the signal. A single SONET ring may be dedicated to a single SHO, such as SONET ring 110 is dedicated to SHO 102 and SONET ring 120 is dedicated to SHO 103. Although a SONET ring may be very reliable, it is also extremely costly.

FIG. 2 (Prior Art) illustrates a native multicast architecture for IPTV content distribution over a national Internet Protocol (IP) backbone. In the native IP-multicast architecture of FIG. 2, routers in the SHO 202 and in the VHOs 204 establish PIM adjacencies with the routers 210 in the national IP backbone 225. Although the architecture of FIG. 2 delivers multicast traffic efficiently, it is not reliable for TV service and requires an upgrade in order to be implemented over a national IP backbone. Although the national IP backbone supports NSF for unicast traffic, it does not support NSF for multicast traffic. Thus, the architecture of FIG. 2 is generally unavailable for use in broadcast TV distribution.

The present invention addresses efficiency and reliability issues as well as problems with scaling issues inherent in previous architectures.

SUMMARY OF THE INVENTION

The present invention provides a method for distributing Internet Protocol Television (IPTV) content. A logical path is defined that connects multiple routers in a ring network topology. The routers are generally grouped in pairs at hub offices. The hub offices generally include a super hub office (SHO) for national TV content and a video hub office (VHO) for local TV content. At least two hub offices are used for the present invention. Generic Routing Encapsulation (GRE) tunneling is used over an existing Internet Protocol (IP) backbone to establish connectivity between adjacent routers over the defined logical path. Typically, logically adjacent routers are connected over a Protocol Independent Multicasting (PIM) adjacency. Also, a direction for content flow is defined using PIM. The routers of the hub offices selectively join to upstream routers. A designated router may be elected for initiating distribution of the IPTV content. In the case of a failure of a router, the direction of content distribution may be reversed by changing the direction in which router join. IPTV content is distributed over the defined path using GRE tunneling. Distributing the IPTV content includes determining at each hub office the necessity of forwarding the content to an adjacent hub office in the downstream direction.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

Generic Routing Encapsulation (GRE) is one possible encapsulation operation performed when tunneling through the Internet. In one aspect, GRE tunnels can provide a secure Virtual Private Network (VPN). GRE provides for the encapsulation of one data packet inside another data packet. An arbitrary network protocol A may thus be transmitted over any other arbitrary network protocol B, by encapsulating the packets of A within GRE packets, which in turn are contained within packets of B. The original packet becomes the payload (i.e., data field, or content) for the final packet, which also includes a new header and trailer. In one aspect, tunnel servers may encrypt the payload, and continuously authenticate the identity of the communicating machines on a packet-by-packet basis. Use herein of the term, Generic Routing Encapsulation, may include reference to equivalent protocols that perform the same functions.

Generic Routing Encapsulation may be used for tunneling purposes, such as providing a secure for communication between source and destinations over an inherently insecure IP-based network. A tunnel may refer to a secure path for communication over an inherently insecure network, such as an IP-based network. Once active, the tunnel is not considered a party to the communication. The tunnel ceases to exist when both ends of the connection are closed.

Figure 1:
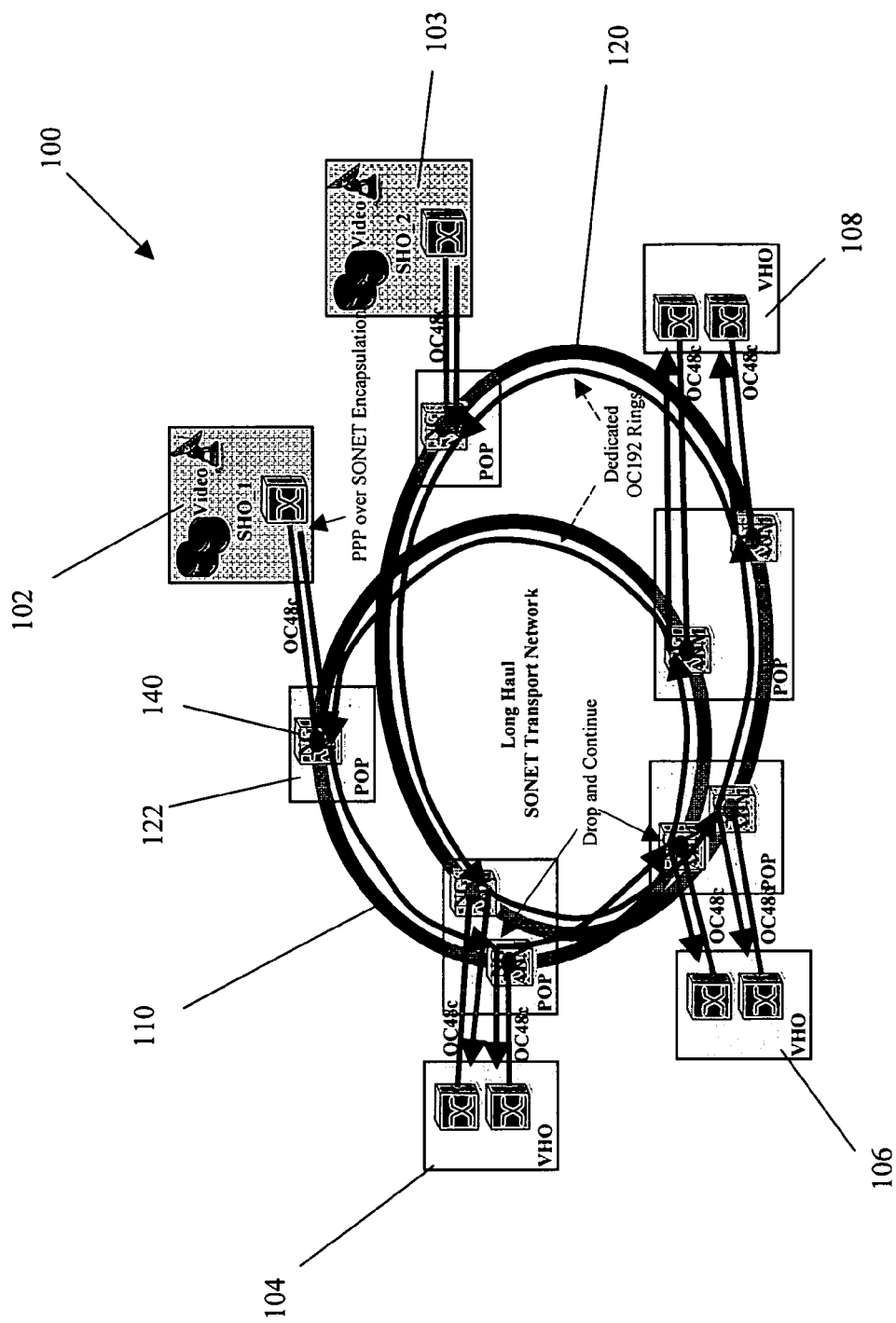
FIG. 1 (Prior Art) illustrates a Synchronous Optical Network (SONET) ring architecture for IPTV content distribution.
Figure 2:
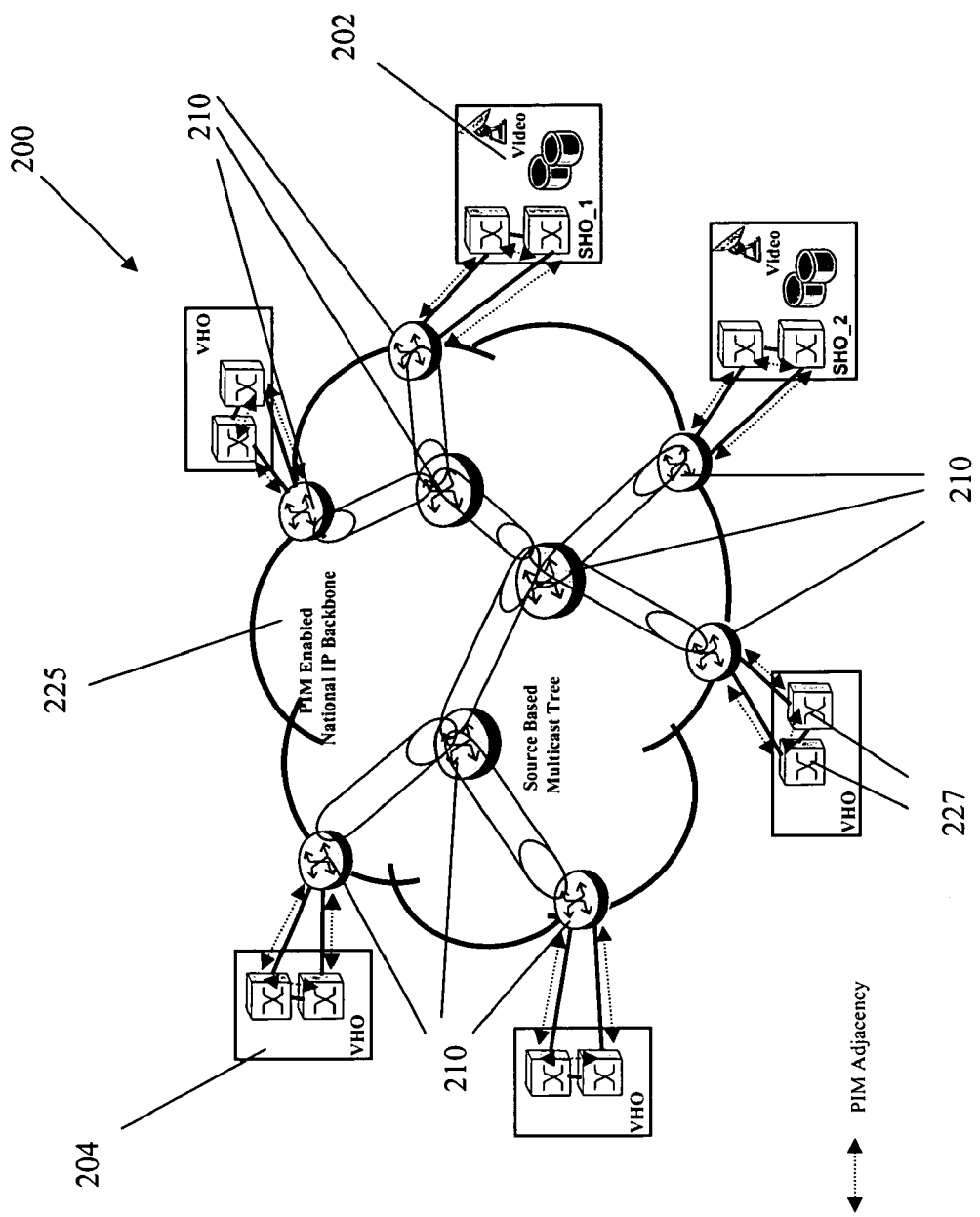
FIG. 2 (Prior Art) illustrates a native multicast architecture for IPTV content distribution over a national IP backbone.
Figure 3:
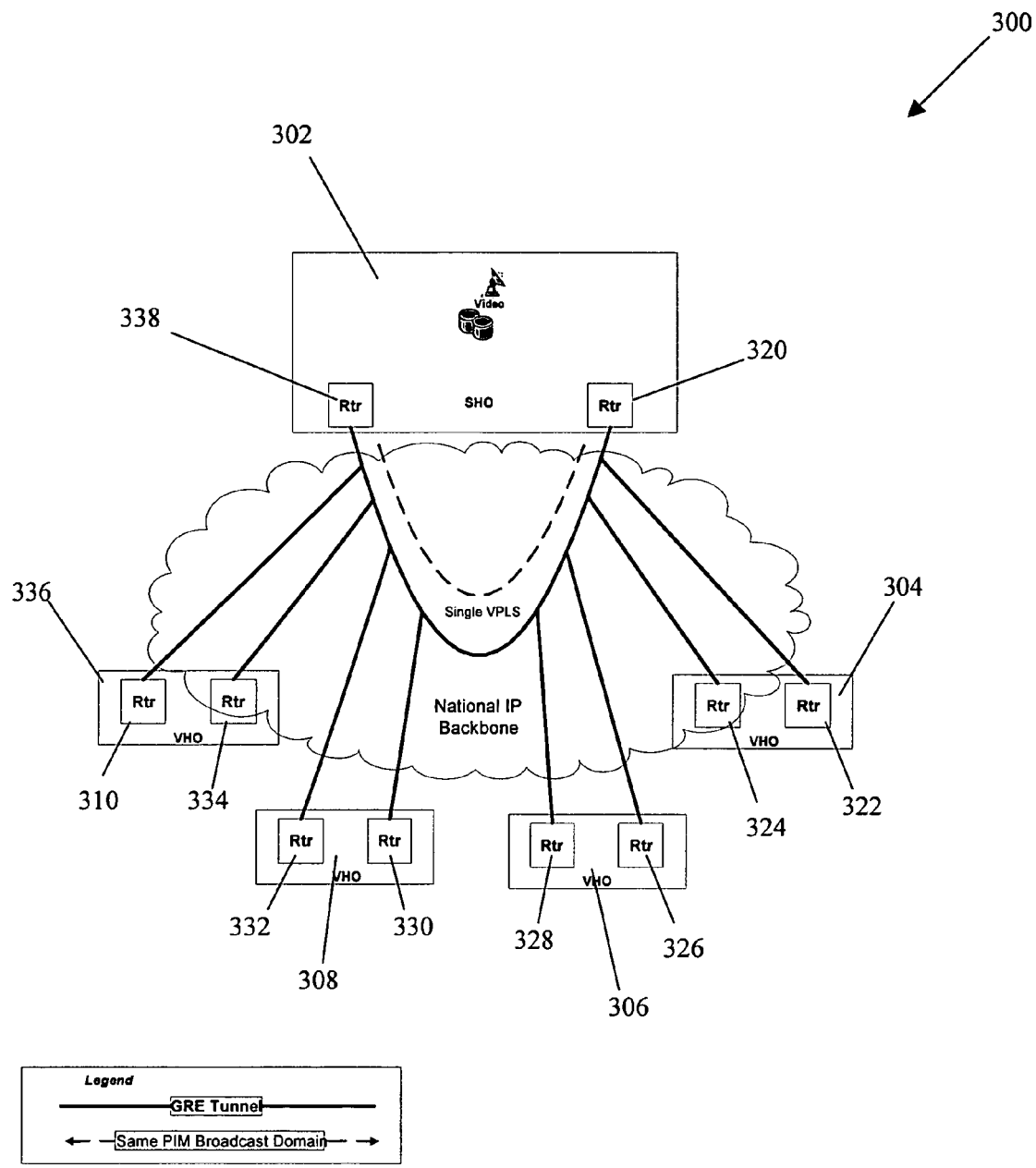
FIG. 3 illustrates a Layer-2 Virtual Private Local Area Network Service (VPLS) ring using Generic Routing Encapsulation (GRE) tunnels through a national IP backbone.

FIG. 3 illustrates an approach to signal distribution in which Generic Routing Encapsulation (GRE) tunnels are routed through a national IP backbone to establish a Layer-2 Virtual Private Local Area Network Service (VPLS) ring. The GRE tunnels form a VPLS ring by connecting routers in separate hub offices. This connection uses NSF over unicast distribution, which the national IP backbone has the capability to operate. FIG. 3 takes advantage of NSF unicast traffic in the national IP backbone and GRE tunneling to establish PIM adjacencies between routers in the hub offices (rather than between routers of the hub office and routers of the IP backbone, as in FIG. 2). The architecture of FIG. 3 thus achieves the efficiency found in the native IP-multicast approach of FIG. 2.

The illustrative architecture of FIG. 3 includes an SHO 302 and several VHOs (304, 306, 308, and 310). The SHO includes two routers (338 and 320) and each VHO also includes two routers: VHO 304 includes routers 322 and 324; VHO 306 includes routers 326 and 328; VHO 308 includes routers 330 and 332; and VHO 310 includes routers 334 and 336. Each router in the hub offices establishes full-mesh PIM adjacencies with the other routers. A full-mesh PIM adjacency enables each hub office to distribute content to every other hub office. Thus, due to the method of distribution, content is distributed evenly to all VHOs. Every VHO of FIG. 3 has two equal cost paths to the video source, regardless of the actual physical distance between the VHO and the video source. All VHOs receive half of their broadcast video traffic from each direction (i.e., from each router in the SHO). The multicasting and routing protocols used in the VPLS ring work effectively over a LAN connection.

Figure 4:
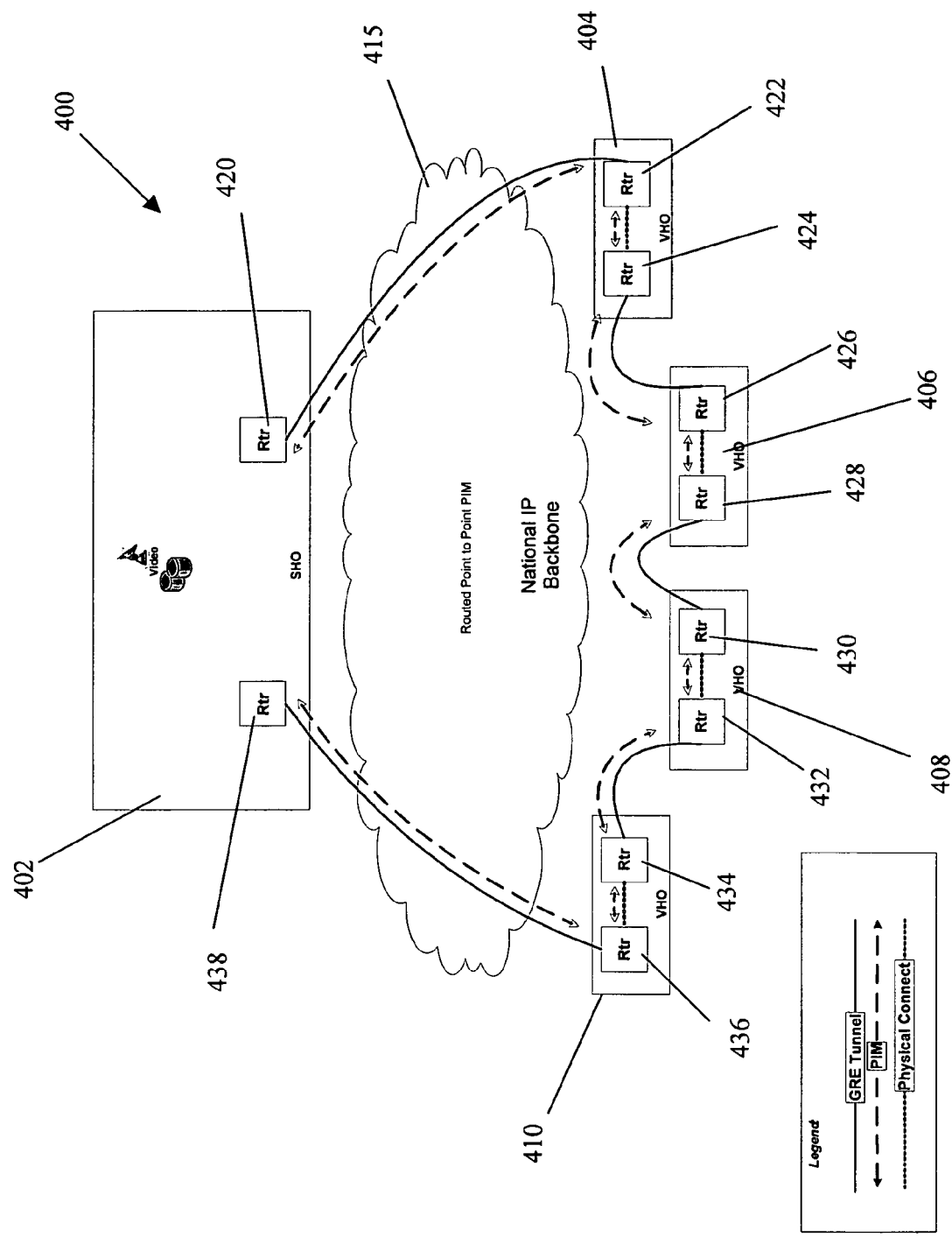
FIG. 4 illustrates a point-to-point routed ring over GRE tunnels through a national IP backbone.

FIG. 4 illustrates a point-point routed ring 400 over GRE tunnels in an exemplary embodiment of the present invention. The point-point routed ring includes a SHO 402 and multiple VHOs (404, 406, 408, and 410) that are logically connected in a ring topology using GRE tunnels through a national IP backbone 415. The SHO 402 includes two routers 438 and 420. Each VHO includes two routers that are internally connected within the VHO. For instance, routers 436 and 434 are internally connected in VHO 410, routers 432 and 430 are internally connected in VHO 408, routers 428 and 426 are internally connected in VHO 406, and routers 424 and 422 are internally connected in VHO 404. The point-point routed interfaces are established between routers in adjacent hub offices to form a logical ring topology. The connection is made possible by a router of one hub office joining to a router of another hub office using GRE tunneling. For instance, router 436 joins to router 438, and router 432 joins to router 434, etc. Each router is connected to a neighboring router over GRE tunnels to form the point-point routed ring.

The flow of content traffic starts from a designated router (for instance, router 438) in the SHO and flows toward the other router (for instance, router 420) in the SHO. In the illustration of FIG. 4, this establishes a counter-clockwise flow of content. There are no multicasting capabilities between the routers of the national IP backbone. Therefore, each SHO router and VHO router establishes PIM adjacencies with an adjacent router, rather than establishing full-mesh PIM adjacencies among all the VHO routers and SHO routers. PIM establishes the adjacencies and consequently a direction of flow. Each VHO receives IPTV content from the adjacent VHO (or adjacent SHO) in the upstream direction.

A designated router (DR) initiates the flow of traffic in the point-point routed ring and may be elected, often based on the assigned IP addresses. The distribution traffic commonly begins at one router in the SHO (i.e. 438) and ends in the other router in the SHO (i.e. 420). In the example of FIG. 4, router 438 is the designated router (DR). Each downstream router joins with an upstream router. Content is forwarded to the adjacent downstream router only if that information is needed at the downstream router.

In the instance where a VHO suffers an event, such as an outage, that removes it operatively from the point-point routed ring, the content may be received at VHOs downstream from the inoperative VHO by reversing the direction of traffic flow and receiving the content from the other SHO router (router 420). Direction reversal is facilitated using PIM. The effect of a VHO failure therefore depends on the position of the failed VHO. As an example, assume that VHO 410 goes down. Since IP multicasting is a source-state protocol, each router is continually refreshing its connection.

The VHO 408 is dynamically joining to VHO 410. If VHO 410 is down, VHO 408 determines that the connection to VHO 410 is down. VHO 408 then changes to joining with VHO 406. VHO 406 then joins to VHO 404, which joins to VHO 402 through router 420. The direction of flow is then reversed along this path. The router 420 is directly connected to the source content and forwards the content to VHO 404, which then forwards it to VHO 406 and finally to VHO 408.

In contrast to FIG. 3, in which all content is received at each VHO, the point-point routed ring architecture of FIG. 4 distributes content to VHOs in a particular order, thereby enabling a distribution in which content is forwarded to the appropriate VHO or VHOs as determined at the designated router. IP multicasting capabilities in the national IP backbone is not used, as it is in FIG. 2. Multicasting and unicasting is identical from the point of view of the IP backbone.

Figure 5:
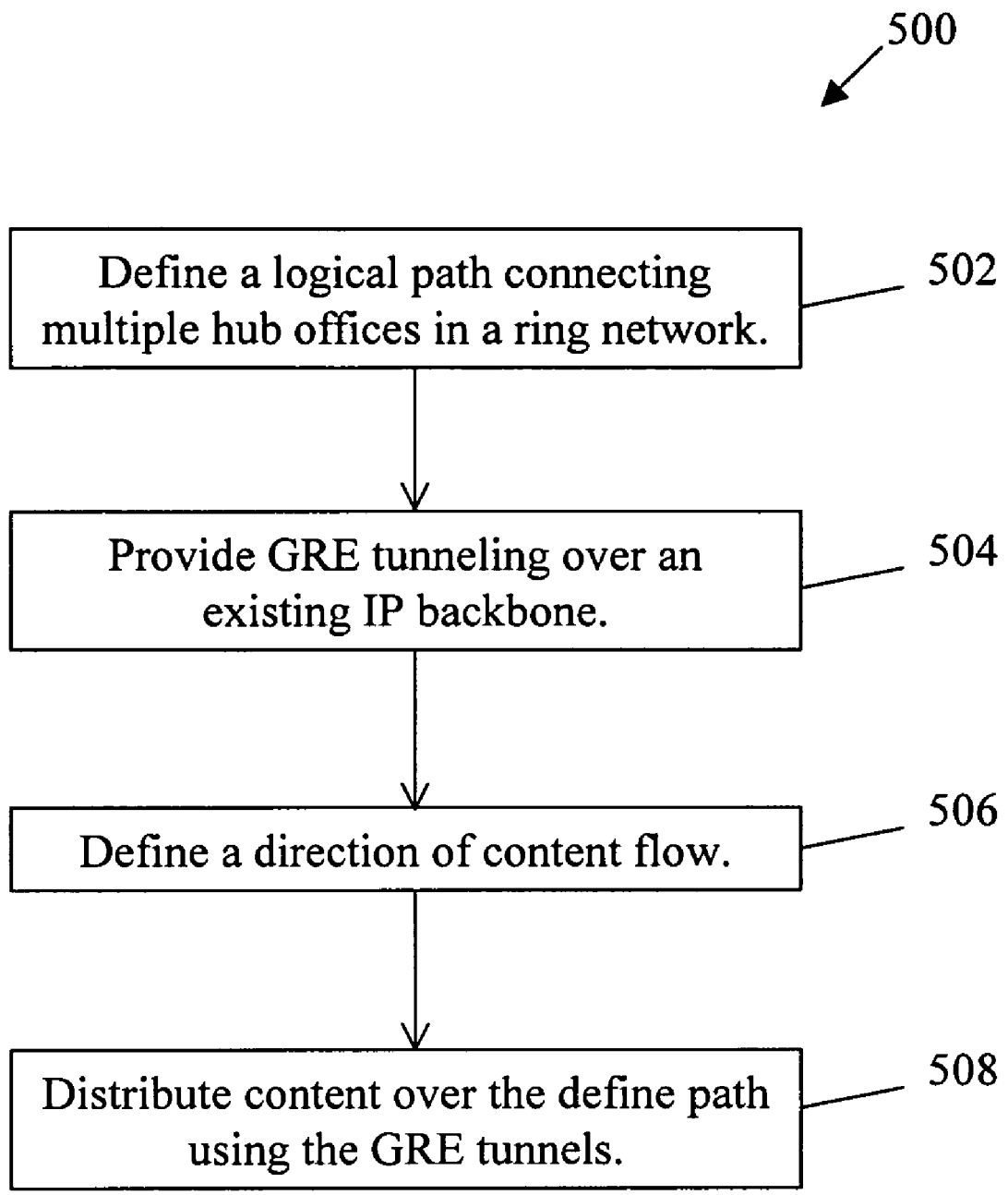
FIG. 5 displays a flowchart for establishing the point-to-point routed ring over GRE tunneling ring of FIG. 4.

FIG. 5 displays a flowchart for establishing a point-point routed ring over a national IP backbone. In Box 502, a logical path is defined which connects multiple routers within hub offices in a point-point routed ring network topology. The hub offices may refer to VHOs and SHOs. Each VHO and SHO typically has two routers. In Box 504, GRE tunnels are used over the logical path defined in Box 502 to provide a connective path between the routers of the hub offices over the national IP backbone. The GRE tunnels are provided between a router of one hub office and a router of an adjacent hub office. An adjacent hub office may be readily determined by examining the logically defined path set out in Box 502. In Box 506, a direction of content flow is determined. In one aspect of the present invention, the direction may be determined by selecting a designated router. PIM adjacencies are used to dynamically join the logically adjacent routers. The routers of the hub offices selectively join to upstream routers to determine the direction of flow. This direction may be reversed by changing the direction in which routers join, as is typically done in the event of a VHO failure. In Box 508, the IPTV content is distributed downstream over the logical path using the GRE tunnels over the national IP backbone. IPTV content is distributed downstream only if there is a need downstream for the content. This need is determined at each router.

The present invention provides recovery capabilities in case of an outage of an element of the point-point routed ring. Table 1 displays outage durations (in seconds) observed upon failures for point-point routed ring architecture (FIG. 4) and the VPLS ring (FIG. 3), using 500 broadcast video channels.

TABLE 1

| Event | Point-point Routed Ring | VPLS Ring |
| --- | --- | --- |
| VHO DR Failure | 3.0 | 3.5 |
| VHO DR Recovery | 2.8 | 4.5 |
| SHE-DR Failure | 2.0 | 1.2 |
| SHE-DR Recovery | 1.4 | 0 |
| SHE-non-DR Failure | 0 | 0.9 |
| SHE-non-DR Recovery | 0 | 0 |
| Link Failure in the National IP Backbone | 0.4 | 0.4 |
| Node Failure in the National IP Backbone | 0.4 | 0.4 |
| Effect of a VHO Failure on Another VHO | 0 | 1.4 |

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices may likewise be constructed to implement the methods described herein. Furthermore, alternative software implementations including, but not limited to, distributed processing or component/object distributed processing, parallel processing, or virtual machine processing may also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for distributing Internet Protocol Television (IPTV) content, comprising:
    defining a logical path in a ring topology the ring topology encompassing a pair of routers from each of a plurality of hub offices wherein each router is connected to a maximum of two other routers including the other router in the respective pair of routers and a logically adjacent router from a logically adjacent hub office;
    providing Generic Routing Encapsulation (GRE) tunnels between each router and its logically adjacent router using an existing Internet Protocol (IP) backbone; and
    distributing the IPTV content between the routers over the logical path using the GRE tunnels.

2. The method of claim 1, wherein providing GRE tunnels further comprises establishing a one-to-one Protocol Independent Multicast (PIM) adjacency to dynamically join the logically adjacent routers.

3. The method of claim 2, wherein dynamically joining routers further comprises defining a direction of content flow over the defined logical path.

4. The method of claim 3, further comprising reversing a direction of content flow over the logical path upon failure of one of the multiple routers.

5. The method of claim 1, wherein the hub offices include at least one super hub office and a plurality of video hub offices.

6. The method of claim 1, further comprising electing a designated router.

7. The method of claim 1, wherein distributing the IPTV content further comprises determining at each router the necessity of forwarding the content to a router in a downstream direction.

8. A system for distributing Internet Protocol Television (IPTV) content, comprising:
   a plurality of routers for distributing and receiving IPTV content over a defined logical path in a ring network topology, the routers configured for using routed Generic Routing Encapsulation (GRE) tunnels to connect over an existing Internet Protocol (IP) backbone, wherein the plurality of routers include a pair of routers from each of a plurality of hub offices and wherein the ring network topology includes a defined logical path in which each router is connected to two other routers including the other router in the respective pair of routers and a logically adjacent router from a logically adjacent hub office, and
   a designated router for defining the distribution of content over the defined logical path and initiating distribution of the IPTV content.

9. The system of claim 8, wherein using the routed GRE tunnels further comprises establishing a one-to-one Protocol Independent Multicast (PIM) adjacency to connect the logically adjacent routers.

10. The system of claim 9, wherein dynamically joining routers further comprises defining a direction of content flow over the defined logical path.

11. The system of claim 10, further comprising reversing the direction of content flow over the logical path upon failure of one of the plurality of routers.

12. The system of claim 8, wherein the plurality of hub offices include at least one super hub office and a plurality of video hub offices.

13. The system of claim 8, wherein distributing the IPTV content further comprises determining at each hub office the necessity of forwarding the content to a hub office in a downstream direction.

14. A computer readable medium containing instructions that when executed by a computer perform a method for distributing Internet Protocol Television (IPTV) content, the method comprising;
   defining a logical path in a ring topology the ring topology encompassing a pair of routers from each of a plurality of hub offices wherein each router is connected to a maximum of two other routers including the other router in the respective pair of routers and a logically adjacent router from a logically adjacent hub office;
   providing Generic Routing Encapsulation (GRE) tunnels between each router and its logically adjacent router using an existing Internet Protocol (IP) backbone; and
   distributing the IPTV content between the routers over the logical path using the GRE tunnels.

15. The medium of claim 14, wherein in the method providing GRE tunnels further comprises establishing a one-to-one Protocol Independent Multicast (PIM) adjacency between the logically adjacent routers.

16. The medium of claim 15, wherein in the method dynamically joining routers further comprises defining a direction of content flow over the defined logical path.

17. The medium of claim 16, the method further comprising reversing a direction of content flow over the logical path upon failure of one of the multiple routers.

18. The medium of claim 14, wherein in the method hub offices include at least one super hub office and a plurality of video hub offices.

19. The medium of claim 14, the method further comprising electing a designated router.

20. The medium of claim 14, wherein in the method distributing the IPTV content further comprises determining at each router the necessity of forwarding the content to a router in a downstream direction.

\* \* \* \* \*